United States Patent [19]
Teradaira et al.

[11] Patent Number: 6,082,910
[45] Date of Patent: Jul. 4, 2000

[54] PRINTING APPARATUS AND A CONTROL METHOD THEREFOR

[75] Inventors: Mitsuaki Teradaira; Naohiko Koakutsu; Takuya Hyonaga, all of Suwa, Japan

[73] Assignee: Seiko Espon Corporation, Tokyo, Japan

[21] Appl. No.: 09/075,400

[22] Filed: May 11, 1998

Related U.S. Application Data

[63] Continuation of application No. 08/664,090, Jun. 6, 1996, Pat. No. 5,800,081, which is a continuation of application No. 08/339,604, Nov. 15, 1994, abandoned.

[30] Foreign Application Priority Data

Nov. 16, 1993 [JP] Japan .................................. 5-287002

[51] Int. Cl.[7] ............................................ B41J 5/30
[52] U.S. Cl. .................................. 400/61; 400/74
[58] Field of Search ................... 400/61, 62, 70, 400/74; 395/114

[56] References Cited

U.S. PATENT DOCUMENTS

| | | |
|---|---|---|
| 4,198,906 | 4/1980 | Fujikawa et al. . |
| 4,930,087 | 5/1990 | Egawa et al. . |
| 4,999,654 | 3/1991 | Maruo et al. ............................ 346/160 |
| 5,124,809 | 6/1992 | Koishidawa ............................ 358/400 |
| 5,168,292 | 12/1992 | Kadowaki et al. ..................... 346/157 |
| 5,218,353 | 6/1993 | Okumura et al. . |
| 5,328,278 | 7/1994 | Kukubo . |
| 5,418,904 | 5/1995 | Tomiyasu et al. ...................... 395/158 |
| 5,433,537 | 7/1995 | Gallagher et al. . ........................... |

FOREIGN PATENT DOCUMENTS

2 225 468   5/1990   United Kingdom .

*Primary Examiner*—John S. Hilten
*Assistant Examiner*—Anthony H. Nguyen

[57] ABSTRACT

This printing apparatus is provided having a regular status data generating circuit for regularly generating status data. An automatic status selection and transmission circuit selects the status condition to be transmitted by the automatic status transmission operation, and a status data comparator compares the status data. By executing the automatic status selection and transmission command, the status is thereafter transmitted each time the selected status changes.

19 Claims, 9 Drawing Sheets

PRINTING APPARATUS AND A CONTROL METHOD THEREFOR

CONTINUING APPLICATION DATA

This is a continuation of prior application Ser. No. 08/664,090 filed on Jun. 06, 1996, now U.S. Pat. No. 5,800,081 which is a continuation of Ser. No. 08/339,604, filed on Nov. 15, 1994 which is now abandoned, the contents of which are incorporated herein by reference.

BACKGROUND OF THE INVENTION

1. Field of the Invention

The present invention generally relates to a printing apparatus, and relates particularly to a printing apparatus suitable for systems, such as point-of-sale (POS) terminals and electronic cash registers (ECR), used in processing monetary transactions.

2. Description of the Background Art

In system having a host processor or computer supplying image, character and/or control data to a printer to produce an output, it is often necessary that the host computer inquire as to the various states of the printer. For example, the host may inquire as to whether there is any paper in a paper supply mechanism, whether there is sufficient toner or ink, whether there is a paper jam or any other malfunction. In response to any of these states, the processor may control the flow of data to the printer or merely notify the user of the malfunction. This can be accomplished by including a status request command within the control command set, and sending the printing apparatus status data to the host computer by executing the status request command when it is received from the host. As a result, the host computer sends the status request command as required to obtain the current status of the printing apparatus.

However, when the status of the printing apparatus changes between one execution of the status request command and the next execution of the status request command, the host computer is not informed the instant such change occurs, and a slight time lag may occur. To reduce the delay time to status change detection, the host computer frequently sends the status request command to the printing apparatus at a very short interval. This frequent sending of the status request commands greatly increases the processing performed by the host computer.

In addition, because the host computer does not know which of the printing apparatus statuses has changed, it is necessary to receive all status data with each output of the status request command, thus increasing the amount of status data and the processing overhead required to interpret the received status data. Furthermore, this large volume of status data is sent from the printing apparatus even when there is no change in the printing apparatus status, significantly reducing the efficiency of status data interpretation because status data having the same content is received and interpreted more than once consecutively. Finally, frequent execution of the status request command by the printing apparatus also reduces the throughput of the printing operation.

OBJECTS OF THE INVENTION

It is the object of the present invention to overcome the aforementioned problems associated with convention host/printer configurations.

It is a further object of the present invention to provide a printing apparatus which can send at least one predetermined status without being requested by a host computer.

It is an additional object of the present condition to provide a host/printer arrangement in which the predetermined status is preselected by the host.

It is another object of the present invention to provide a host/printer configuration which is highly reliable and efficient.

It is still yet a further object of the present invention to provide a printing apparatus whereby a high reliability, high efficiency system can be constructed by transmitting the status data after an automatic status selection and transmission command is executed only when the selected status changes, thereby enabling the host computer to obtain the change in the status of the required printing apparatus using the smallest amount of status data required.

SUMMARY OF THE INVENTION

To achieve the above object, a printing apparatus according to the present invention is connected to a host device and notifies the host device of the state of the printing apparatus, and comprises a state detection means for detecting the state of the printing apparatus. A state change detection means detects a change in the output of the state detection means, and a state notifying means for communicate the output of the state detection means to the host device based on the output of the state change detection means. In this configuration, the state change detection means comprises a state storing means for storing the state communicated to the host device by the state notifying means, and a state comparing means compares the stored state with the state detected by the state detection means.

The state detection means and state change detection means are provided in plural numbers corresponding to the states to be detected, and the state notifying means operates based on the output of at least one of the state change detection means.

The printing apparatus of the invention may further comprise a change detection limiting means for prohibiting or permitting the output of the state change detection means in a number corresponding to the number of state change detection means. In this case, the change detection limiting means prohibits or permits the output of the state change detection means based on a control command received from the host device. The state notifying means then communicates to the host device the output of the state detection means corresponding to the state change detection means permitted to output; or, the state notifying means communicates to the host device the output of the state detection means corresponding to the state change detection means that output.

Alternatively, the state detection means are separated into plural groups, and the state notifying means communicates to the host device the outputs of the state detection means contained in the group associated with the state detection means corresponding to the state change detection means that output.

To implement this configuration, it is effective for the group of state detection means to include one group of state detection means for detecting abnormal printing apparatus states, the presence of print media, and whether communications with the host device is enabled or disabled, or for detecting the state of peripheral devices connected to the printing apparatus.

In accordance with an embodiment of the present invention, once the automatic status selection and transmission command is executed, the status data is transmitted only when the selected status changes. The host computer can therefore obtain the change in the status of the required printing apparatus using the minimum required amount of status data.

The overhead for command transmission is therefore reduced because the host computer no longer frequently outputs the status request command; the amount of status data received is reduced and the overhead for status data interpretation is therefore also reduced; and the efficiency of status data interpretation is improved because only the minimum required amount of status data is used.

As is apparent, the throughput of the printing apparatus is also improved because the frequency of status request command execution is reduced.

As a result, it is possible to provide a printing apparatus whereby a high reliability system can be constructed.

Other objects and attainments together with a fuller understanding of the invention will become apparent and appreciated by referring to the following description and claims taken in conjunction with the accompanying drawings.

BRIEF DESCRIPTION OF THE DRAWINGS

Similar reference characters refer to similar parts throughout the various embodiments of the present invention.

DESCRIPTION OF THE PREFERRED EMBODIMENTS

A first embodiment of the invention is described below with reference to the accompanying figures.

In general, recording paper used in the distribution industry is either cut-sheet or continuous forms paper. Cut-sheet paper includes irregularly sized, individual voucher forms called slip paper, and multiple-part individual voucher forms, called validation paper, of a relatively regular size. Continuous paper includes journal paper for printing and storing store records, and receipt paper used for simple receipts.

Figure 1:
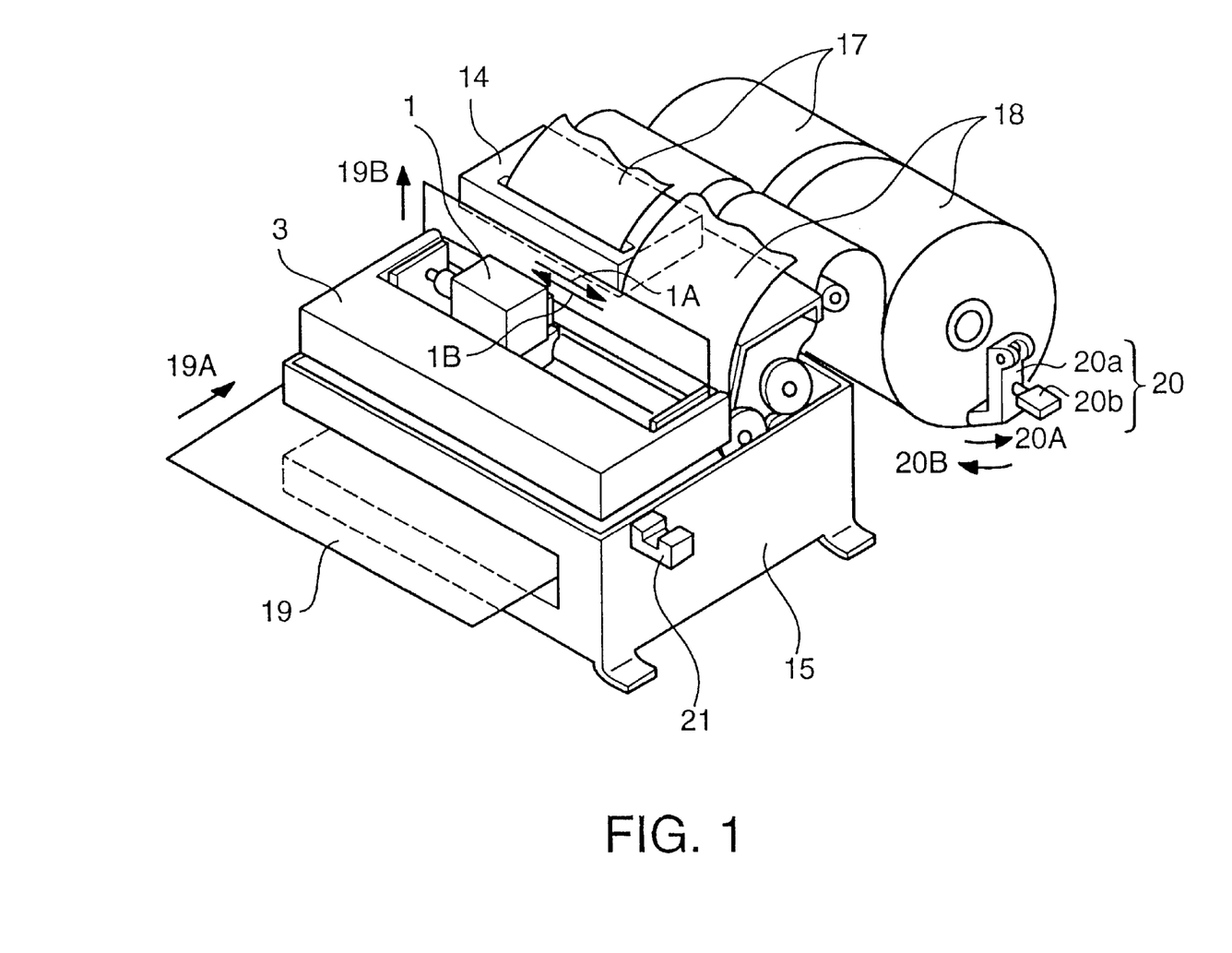
FIG. 1 is a perspective view of a printing apparatus used in accordance with the preferred embodiment of the present invention.

FIG. 1 is an overview of a printing apparatus capable of printing to slip-, journal-, and receipt-type recording paper.

As shown in FIG. 1, this printing apparatus comprises printer head 1, which is typically a so-called "wire dot head" comprising plural wires arrayed in a vertical line; and ink ribbon 3. The printer head 1 prints while being driven in a reciprocal motion as indicated by arrows 1A and 1B.

Receipt paper 17 and journal paper 18 are typically inserted from the back of the printer mechanism in roll form, and are fed out from the top as shown in the figure. Slip paper 19 is generally inserted from the front of the printer mechanism (arrow 19A), and similarly fed out from the top (arrow 19B). After printing is completed, receipt paper 17 is cut by cutter unit 14, and can be handed to the customer.

Near-end detector 20 is also provided for detecting the end of the receipt and journal paper. Near-end detector 20 comprises, for example, a near-end detecting lever 20a, which is pushed out in the direction of arrow 20A by the outside diameter of the roll paper, and a push switch 20b, which is turned on/off by near-end detecting lever 20a. The outside diameter steadily decreases as the end of the roll paper approaches, and when the core of the roll paper is reached, near-end detecting lever 20a rotates in the direction of arrow 20B. This causes push switch 20b to switch to the OFF state, thus detecting the near-end of the paper.

The printing apparatus is covered by a housing not shown in the figures; this housing comprises a cover that is not shown and lower case 15A. Cover detector 21 is providing to detect the opening or closing of the cover and comprises an opposed-type photodetector. When the cover is closed, the beam from cover detector 21 is interrupted, and the cover can be detected to be closed. Alternatively when the cover is opened the photo detector defects the beam.

FIGS. 2A and 2B are cross-sectional views illustrating the operation of the printing apparatus of the present invention during printing to continuous and cut-sheet paper; FIG. 2A shows printing to continuous paper (receipt paper) and FIG. 2B shows printing to cut-sheet paper (slip paper).

The wire pins (not shown in the figure) of printer head 1 are provided in wire holder 1a for printing through ink ribbon 3 to receipt paper 17 against platen 2. Receipt paper 17 is fed by transport rollers 6a and 6b passed guide roller 5 and between paper guides 4a and 4b. The one transport roller 6a is connected to a motor or other drive power source (not shown in the figures).

A receipt paper detector 12 is provided for detecting the presence or absence of receipt paper 17). Receipt paper detector 12 comprises, for example, an opposed-type photodetector, lever switch, or other detecting means positioned in the middle of paper guides 4a and 4b.

Referring again to FIG. 2A, when transported by transport rollers 6a and 6b, receipt paper 17 passes between ink ribbon 3 and platen 2, through presser rollers 7a and 7b and cutter unit 14, and is fed out from the top of the printing apparatus. The cutter unit 14 comprises cutter blade 14a and cutter cover 14b; cutter blade 14a is driven in the direction of arrow 14A by a motor or other drive power source to cut receipt paper 17.

It is to be noted that while receipt paper is shown in the figure, the mechanism used for journal paper is the same except for the cutter unit. This is because journal paper is used for storing data by the store, and is not used for customer receipts.

Turning now to FIG. 2B, when slip paper is printed, slip paper 19 is inserted from slip paper insertion opening 22 at the front of the printing apparatus in the direction of arrow 19A. During roll paper printing, slip feed roller 9a is pulled in the direction of arrow 10A by plunger 10 as shown in FIG. 2A, and is thus separated from the opposing slip transport roller 9b. As a result, it is possible to insert slip paper 19. When slip paper 19 is inserted, slip paper 19 passes between slip paper guides 11a and 11b and meets slip transport rollers 8a and 8b. A slip paper detector 13 detects whether slip paper has been inserted. If paper has been inserted, plunger 10 is released and lever 10a moves in the direction of arrow 10B, thus pressing slip transport roller 9b against slip feed roller 9a, and holding slip paper 19 therebetween.

Slip transport rollers 8b and 9b are connected to a motor or other drive power source not shown in the figures, and slip paper 19 is transported as slip transport rollers 8b and 9b and the opposing slip transport rollers 8a and 9a rotate in the direction of arrows 8B, 9B, and 8A, 9A, respectively. When printing is completed, slip paper 19 is fed out in the direction of arrow 19B, plunger 10 is driven to separate slip transport roller 9a from slip transport roller 9b, and the next slip paper form can be inserted.

Printing to slip paper 19 is possible with receipt paper 17 loaded as shown in the figure, and if carbon-copy paper is added to slip paper 19, the same information can be simultaneously printed to both slip paper 19 and receipt paper 17. A slip paper detector is provided for detecting the absence or presence of slip paper 19, slip paper detector 13 is an opposing-type photodetector similar to receipt paper detector 12.

Also shown are lower case 15 and case 16 supporting the head assembly.

Figure 3:
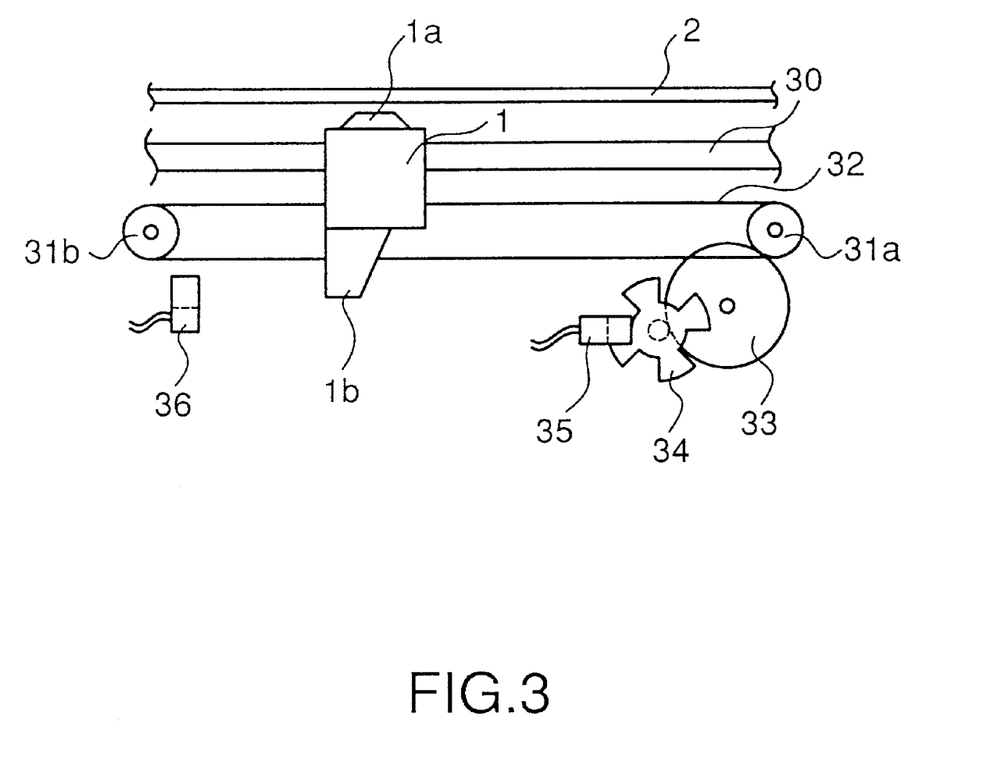
FIG. 3 is a cross-sectional view of the printing mechanism of a printing apparatus of FIG. 1.

FIG. 3 is a cross-sectional view of the printing unit of the printing apparatus in accordance with one embodiment of the invention. The printing unit comprises a detector for detecting a loss of synchronism.

The method of detecting the loss of synchronism in the head carriage drive motor is described with reference to FIG. 3. Printer head 1 is fixedly secured on head carriage 1b together with wire holder 1a. Head carriage 1b is driven reciprocally side to side by carriage transfer belt 32 and carriage drive gears 31a and 31b; carriage drive gear 31a is connected to a head carriage drive motor not shown in the figure. This motor is typically a pulse motor. Carriage drive gear 31a drives rotating detector plate 34 via transfer gear 33. Carriage detector 35, which is also an opposing-type photodetector, is positioned with rotating detector plate 34 between the members thereof so that it detects rotation of rotating detector plate 34, which rotates with the movement of head carriage 1b.

Note that rotating detector plate 34 is propeller-shaped, and when it rotates, the output of carriage detector 35 switches on/off on a regular period. More specifically, when head carriage 1b is driven reciprocally by the head carriage drive motor (not shown in the figure), the movement of head carriage 1b is detected by carriage detector 35.

If the receipt paper, journal paper, or slip paper between printer head 1 and platen 2 is wrinkled or twisted and catches between wire holder 1a and platen 2, a paper jam occurs. As a result, head carriage 1b no longer tracks rotation of the carriage drive motor, and the carriage drive motor loses synchronization thereof. This loss of synchronization is detected by carriage detector 35, and indicated as a "carriage error."

A "home position" for printer head 1 is utilized to determine a reference point for the print position. Home position detector 36 is also an opposing-type photodetector for detecting head carriage 1b. More specifically, when head carriage 1b moves to the left, the position at which the light beam from home position detector 36 is interrupted is the reference point for the home position.

When head carriage 1b moves toward the home position, home position detector 36 can detect if printer head 1 does not reach the home position due to a paper jam or other factor. A home position error occurs when head carriage 1b cannot be returned to the home position.

Figure 4:
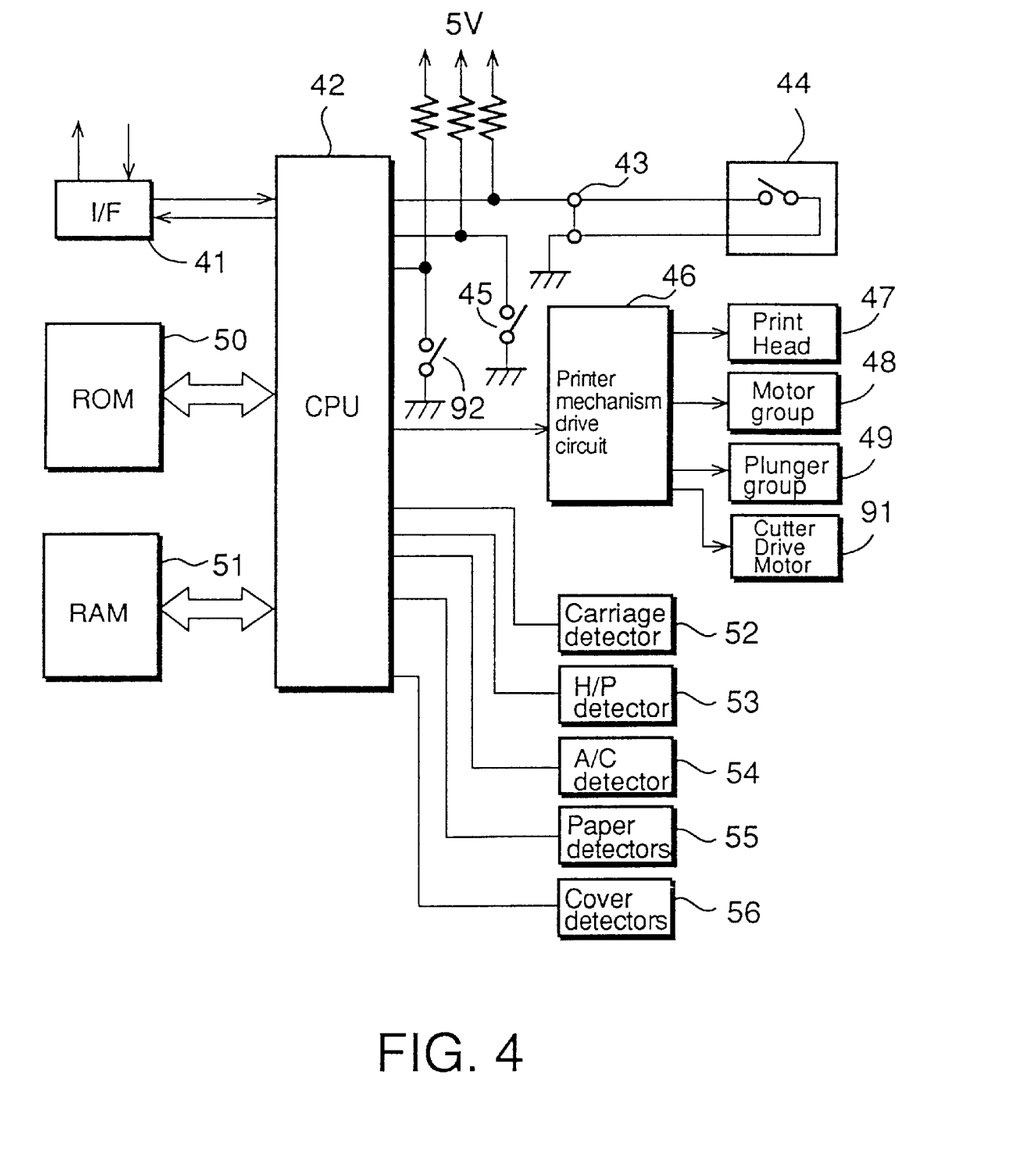
FIG. 4 is a circuit block diagram of the control circuit in accordance with the preferred embodiment of the present invention.

An example of circuit block diagram of the control circuit according to the present invention is shown in FIG. 4.

The mechanism of the printing apparatus of the invention as described above is represented as print head 47, motor group 48, and plunger group 49 in FIG. 4; this printer mechanism is driven by printer mechanism drive circuit 46. The printer mechanism also comprises carriage detector 52, home position detector 53, automatic cutter detector 54, paper detectors 55, and cover detectors 56, each of which is connected to central processing unit (CPU) 42.

Also connected to CPU 42, which controls the entire printing apparatus, is panel switch 45, which may be used for manual paper feeding, for example; interface 41 for communications with the host computer; ROM 50 for storing the control program, print character patterns, and other static information; RAM 51 functioning as a receive buffer, print buffer, and other data buffers; and connector 43.

A cash drawer or other peripheral device may be connected to connector 43, and the state of the connected peripheral device can be determined by detecting the appropriate TTL level.

When print data is input from interface 41, the data is stored to the receive buffer of RAM 51, and CPU 42 interprets the data, reads the character patterns corresponding to the data code from ROM 50, and drives print head 47, motor group 48, and plunger group 49 by means of printer mechanism drive circuit 46 to print.

Automatic cutter detector 54 is provided for detecting the position of cutter blade 14a (FIG. 2A). A cutter blade drive motor 91, drives cutter blade 14a in a response to printer mechanism drive circuit 46, and detector 54 generates a detector signal when cutter blade 14a is at a predetermined position. If a paper jam occurs in the vicinity of cutter blade 14a, the cutter blade will not move to the specified position, the detector signal will not be output. In response to detector 54, CPU 42 will determine that an error or malfunction has occurred. This error is called a "cutter error."

CPU 42 will determine other errors in a similar manner in response to other detectors. Carriage errors, home position errors, and cutter errors each result in what is generally referred to as an "error state" below.

Figure 5:
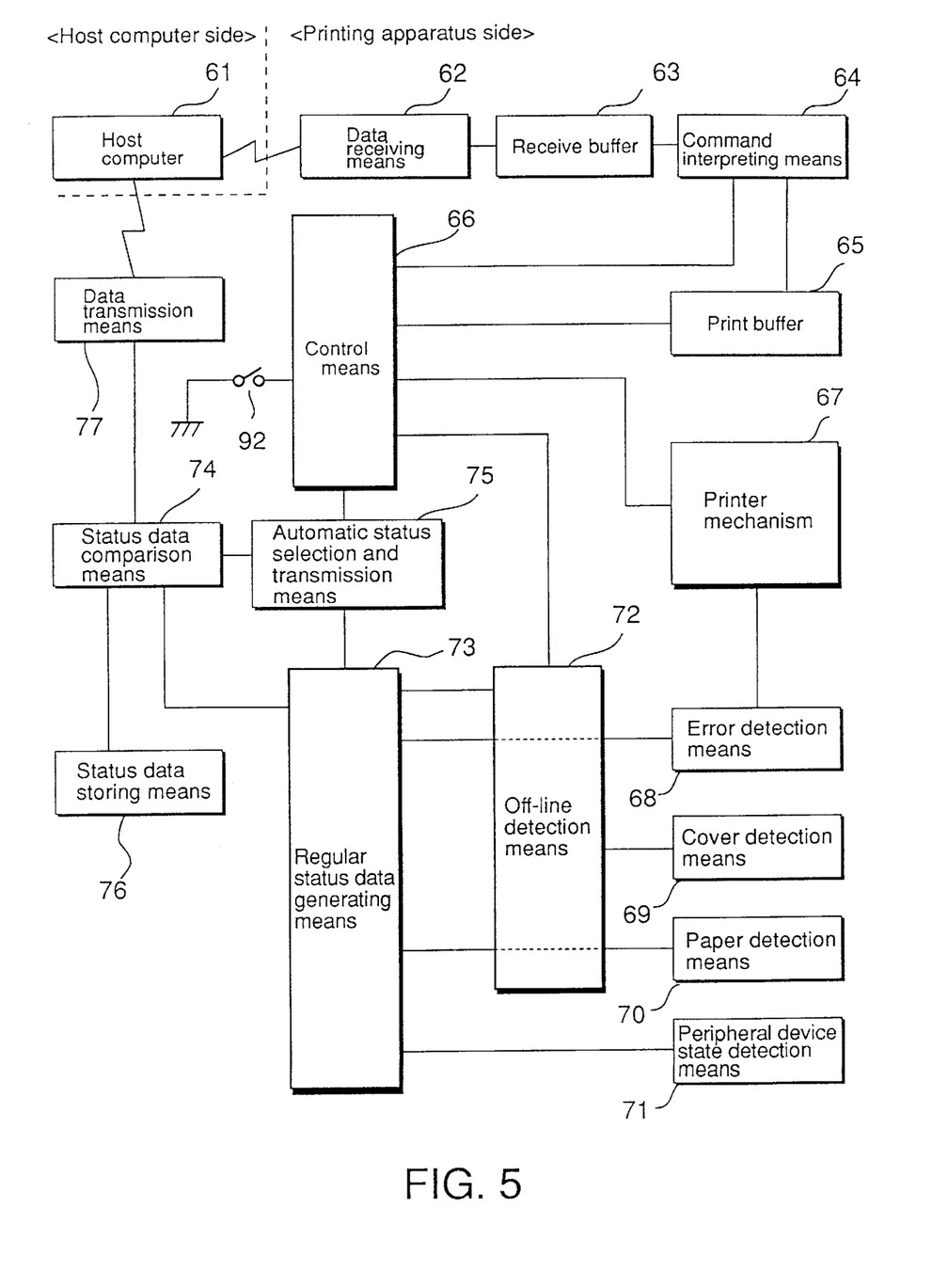
FIG. 5 is a functional block diagram in accordance with the preferred embodiment of the present invention.

FIG. 5 is a functional block diagram showing the overall mechanism of the invention, and the relationships between the various functional means.

Host computer 61 transmits the command data, print data, and other information to the printing apparatus. Data receiving means 62 receives the data from host computer 61 through an interface, and temporarily stores all received data to receive buffer 63.

The received data stored to receive buffer 63 is read one by one by command interpreting means 64. The received data is interpreted, and determined to be either print data or a control command for controlling the printing apparatus. Control commands are applied by control means 66 to execute the settings or operations corresponding to the command code. Print data is used to store the character patterns corresponding to the data codes to print buffer 65. When printing is then executed by control means 66, control means 66 reads the print pattern from print buffer 65, and controls printer mechanism 67 to print.

If a malfunction occurs such as a paper jam or other error occurs during printing, paper transport, paper cutting, or other stage, the error is detected by error detection means 68. Furthermore, cover detection means 69 detects if the cover is open; paper detection means 70 detects whether paper is loaded; and peripheral device state detection means 71 detects the status of an peripheral devices connected to the printing apparatus.

The detection results from error detection means 68, cover detection means 69, and paper detection means 70 are communicated to off-line detection means 72 to regular status data generating means 73. If off-line detection means 72 detects an error, cover-open, or no-paper state, it outputs information to control means 66 informing control means 66 that the printing apparatus is in a printing-disabled state, i.e., is off-line. Control means 66 thus stops printer mechanism 67, stops interpretation of the received data by the command interpreting means, and goes off-line. Off-line detection means 72 also sends the off-line status detection result to regular status data generating means 73.

Regular status data generating means 73 regularly generates status data of a data format that can be sent to the host computer based on the detection results of off-line detection means 72, error detection means 68, paper detection means 70, and peripheral device state detection means 71.

Note that in this embodiment error detection means 68, cover detection means 69, paper detection means 70, peripheral device state detection means 71, and off-line detection means 72 are used as status detection means. Of course as will be appreciated by one of ordinary skill in the art, other types of states may be detected and incorporated into the present embodiment.

The interface used in this embodiment is preferably a standard RS-232C two-way, serial interface; the data length is set to 8 bits when the power is turned on. The status data is therefore also generated in an 8-bit length. Of course, as will be appreciated other interfaces may be utilized.

The status data generated by regular status data generating means 73 for the status selected by an automatic status selection and transmission means 75 is compared by status data comparison means 74 with the corresponding status data stored in status data storing means 76. If the compared status data are different, the status data generated by regular status data generating means 73 is sent to host computer 61 through data transmission means 77, and also stored in status data storing means 76 to update the stored status data.

Automatic status selection and transmission means 75 is controlled by control means 66 according to the automatic status selection and transmission command sent from the host computer. The status data selected by automatic status selection and transmission means 75 is the status detected by one or more of the state detection means: for example, off-line detection means 72, error detection means 68, paper detection means 70, and peripheral device state detection means 71. When a selection is made, automatic status transmission is enabled. When no status is selected, status data generation by regular status data generating means 73 is disabled, and automatic status transmission is also disabled.

The automatic status selection function is enabled by designating at least one status bit in the automatic status selection and transmission means 75 and regular status data generating means initiates it operation. This function is realized by employing a timer interrupt process which is executed at regular intervals. More specifically, when any one of the status selection bits in automatic status selection and transmission means 75 is set by the automatic status selection command, control means 66 sets parameters in the timer and enables the timer to interrupt the normal processing of the control means 66, thus enabling regular status data generating means 73.

Referring again to FIG. 5, DIP-switch 92 is implemented in control means 66. When DIP-switch 92 is turned on, all the status bits included in the printer status byte and off-line status byte are designated to cause the automatic status transmission and stored in automatic status transmission selection means 75 with priority to the automatic status transmission selection command. And, if it is turned off, the designation of the status bits can be controlled by the automatic status transmission selection command.

Figure 6:
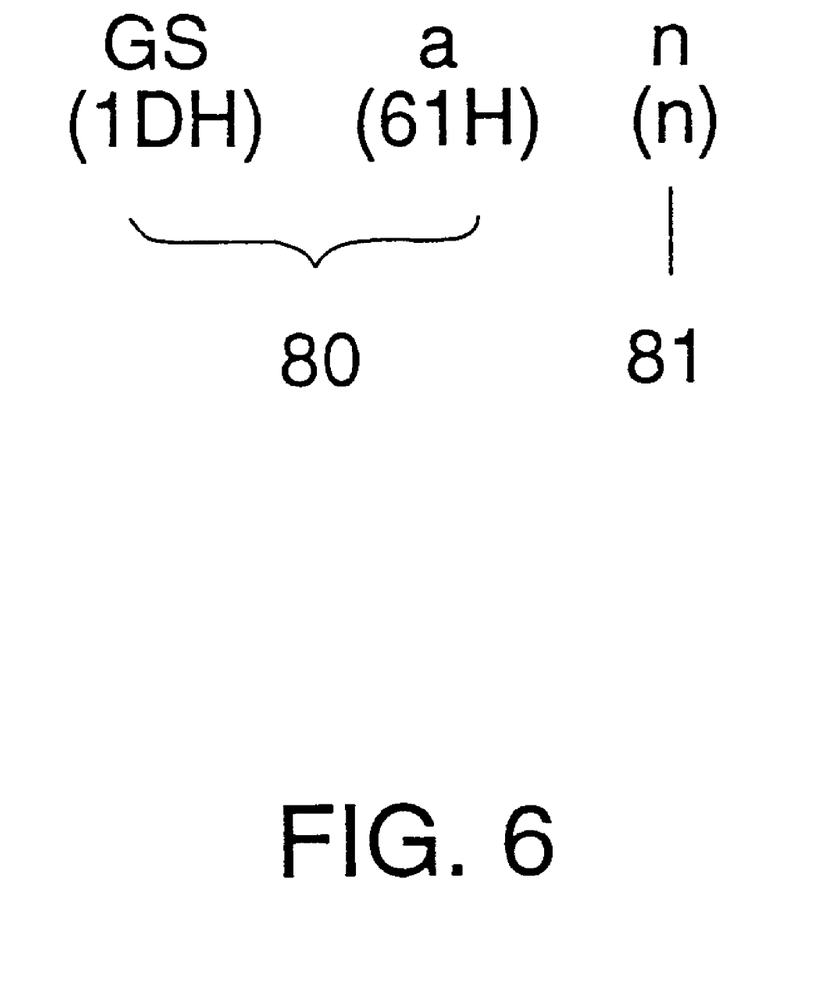
FIG. 6 illustrates a control command in accordance with the present invention.

FIG. 6 shows the automatic status selection and transmission command code for selecting the status that is to be automatically transmitted to the host device by the printing apparatus of the present embodiment. Referring to FIG. 6, [GS a] 80 indicates the type of control command based on the combination of the [GS] code (1DH) and [a] code (61H). When this code is interpreted by the command interpreting means, it is determined to be the automatic status selection and transmission command.

The printing apparatus status byte (one byte) shown in Table 1 is sent to the host computer.

TABLE 1 printer status

| Bit | Function | Value 0 | 1 |
|---|---|---|---|
| 0 | Reserved | Fixed to 0 | |
| 1 | Reserved | Fixed to 1 | |
| 2 | Drawer kick connector | 0 | 1 |
| 3 | On-line/off-line status | on-line | off-line |
| 4 | Reserved | Fixed to 1 | |
| 5 | Undefined | | |
| 6 | Undefined | | |
| 7 | Reserved | Fixed to 0 | |

The drawer status, and printing apparatus on-line/off-line status can be determined by the host computer based on the printing apparatus status information. When the printing apparatus is off-line, more specific off-line information can be obtained.

The off-line information byte (one byte) shown in Table 2 is sent to the host computer.

TABLE 2 off-line cause status

| Bit | Function | Value 0 | 1 |
|---|---|---|---|
| 0 | Reserved | Fixed to 0 | |
| 1 | Reserved | Fixed to 1 | |
| 2 | Cover status | Closed | Open |
| 3 | Form feed by form feed switch | Form feed not in progress | Form feed in progress |
| 4 | Reserved | Fixed to 1 | |
| 5 | No paper: printing stopped | Printing not stopped | Printing stopped |
| 6 | Error status | No error | Error generated |
| 7 | Reserved | Fixed to 0 | |

The host computer can thus evaluate the off-line information, and can post prompts or other appropriate information to the user based on the evaluation result. If an error is determined to have occurred, detailed error information can be obtained.

The error information byte (one byte) shown in Table 3 is sent to the host computer.

TABLE 3 error cause status

| | | Value | |
|---|---|---|---|
| Bit | Function | 0 | 1 |
| 0 | Reserved | Fixed to 0 | |
| 1 | Reserved | Fixed to 1 | |
| 2 | Mechanical error | No error | Error generated |
| 3 | Automatic paper cutter error | No error | Error generated |
| 4 | Reserved | Fixed to 1 | |
| 5 | Non-recoverable error | No error | Error generated |
| 6 | Auto-recover error | No error | Error generated |
| 7 | Reserved | Fixed to 0 | |

The mechanical errors shown in Table 3 refer primarily to errors due to a paper jam, but also include carriage errors and home position errors. These are further distinguished as paper jams around the printer head, and automatic paper cutter errors, thereby enabling the host computer to distinguish between paper jams occurring around the printer head, and in the automatic paper cutter. Based on this determination, the user is appropriately notified using the display means of the host computer where the error occurred, thus facilitating removal of the paper jam.

Printing can be resumed when paper jam errors and similar errors occur by removing the paper jam or other error cause. Errors can also occur as a result of external power supply problems, damage to the printer head temperature detector, and other causes making resumption of printing difficult, and it is necessary to distinguish these non-recoverable errors from recoverable errors (from which printing can be resumed). Errors other than paper jam errors are therefore identified as non-recoverable errors by setting bit 5.

The continuous paper (incl. journal and receipt paper) detector information byte (one byte) shown in Table 4 is sent to the host computer.

TABLE 4 continuous paper detector status

| | | Value | |
|---|---|---|---|
| Bit | Function | 0 | 1 |
| 0 | Reserved | Fixed to 0 | |
| 1 | Reserved | Fixed to 1 | |
| 2 | Journal near-end detector | Paper loaded | No paper |
| 3 | Receipt near-end detector | Paper loaded | No paper |
| 4 | Reserved | Fixed to 1 | |
| 5 | Journal end detector | Paper loaded | No paper |
| 6 | Receipt end detector | Paper loaded | No paper |
| 7 | Reserved | Fixed to 0 | |

The slip paper detector information byte (one byte) shown in Table 5 is sent to the host computer.

TABLE 5 slip status

| | | Value | |
|---|---|---|---|
| Bit | Function | 0 | 1 |
| 0 | Reserved | Fixed to 0 | |
| 1 | Reserved | Fixed to 1 | |
| 2 | Slip paper selection | Selected | Not selected |
| 3 | Slip paper insertion wait-state | Waiting | Not waiting |
| 4 | Reserved | Fixed to 1 | |
| 5 | Slip paper detector | Paper loaded | No paper |
| 6 | | | |
| 7 | Reserved | Fixed to 0 | |

It is possible to determine from this slip status byte shown in Table 5 whether slip paper is selected or whether continuous or validation paper is selected. It is also possible to determine when slip paper is selected whether the printing apparatus is waiting for slip paper insertion, or whether the paper has already been loaded and printing can proceed.

The validation paper detector information byte (one byte) shown in Table 6 is sent to the host computer.

TABLE 6 validation status

| | | Value | |
|---|---|---|---|
| Bit | Function | 0 | 1 |
| 0 | Reserved | Fixed to 0 | |
| 1 | Reserved | Fixed to 1 | |
| 2 | Validation paper selection | Selected | Not selected |
| 3 | Validation paper insertion wait-state | Waiting | Not waiting |
| 4 | Reserved | Fixed to 1 | |
| 5 | Validation paper detector | Paper loaded | No paper |
| 6 | | | |
| 7 | Reserved | Fixed to 0 | |

It is possible to determine from this validation status byte shown in Table 6 whether validation paper is selected or whether continuous or slip paper is selected. It is also possible to determine when validation paper is selected whether the printing apparatus is waiting for validation paper insertion, or whether the paper has already been loaded and printing can proceed.

The value [n] 81 is a parameter of the command, and is specifically the value used to determine the status for automatic transmission to the host device. The values of [n] 81 are selected from among those shown in Table 7 in this embodiment, and is set in automatic status selection and transmission means 75 by control means 66 as shown in FIG. 5.

TABLE 7

| | | Value | |
|---|---|---|---|
| Bit | Function | 0 | 1 |
| 0 | Undefined | | |
| 1 | Undefined | | |
| 2 | Peripheral device status | disable | enable |

TABLE 7-continued

| Bit | Function | Value 0 | 1 |
|---|---|---|---|
| 3 | On-line/off-line status | disable | enable |
| 4 | Undefined | | |
| 5 | Paper detector status | disable | enable |
| 6 | Error status | disable | enable |
| 7 | Undefined | | |

The default value of [n] is 0H, and no status is therefore selected; automatic status transmission is also disabled.

TABLE 8

| Status Bytes | Designated Status | Peripheral Device | On/Off-Line | Paper Detector | Error |
|---|---|---|---|---|---|
| 0 | Printer | S | S | N | N |
| 1 | Off-Line Cause | N | S | S | S |
| 2 | Error Cause | N | S | N | S |
| 3 | Continuous Paper | N | S | S | N |
| 4 | Slip Paper | N | S | S | N |
| 5 | Validation Paper | N | S | S | N |

Table 8 shows the relationship between status bits designated by using the automatic status transmission selection command and status bytes to be sent to the host device corresponding to the change in the status bits. In the table "S" means that the status byte in the same row will be sent while the status bit in the same column is designated corresponding to the change in the status bit. On the contrary, the status byte will not be sent, if 'N" is placed in the same row, corresponding to the change in the status bit in the same column as the "N".

As will be understood from the table, there are 4 groups of status bytes each corresponding to each of the status bits, namely the drawer connector status (bit 2 in the printer status byte), the on-line/off-line status (bit 3 in the printer status byte), the no paper status (bit 5 in the off-line cause status byte) and the error status (bit 6 in the off-line cause status byte). The status bytes including in the same group will be sent when the change in the corresponding status bit is detected by the status data comparison means 74. For example, the error status group comprises the off-line cause status byte and the error cause status byte.

Since the numbers of bytes to be sent are different among the groups, it is necessary to predetermine the order of bytes for each group in order to identify the status bites included in the status bytes. In the present embodiment the status bytes are sent in the same order as the status byte numbers, namely the status byte with smaller byte number, sent earlier. For example, in the case of the no paper status group, the off-line cause status byte (byte 1) is sent first followed by the continuous paper status byte (byte 3), slip paper status byte (byte 4) and lastly the validation paper status byte (byte 5).

When plural status bits are designated by using the automatic status transmission selection command, the groups corresponding to the status bits are combined each other and sent in the same order as the byte numbers. For example, if both the drawer connector status and error status are designated, the printer status byte, off-line cause status byte and error cause status byte are transferred corresponding to the change in any one of the status bits designated is detected. This is because the host system does not know which status changes, and consequently, the host can not identify the status byte received first if the groups of status bytes are different among the status bits which cause the status byte transmission.

Each group contains the minimum status bytes necessary for analyzing the corresponding status. For example, in the cause of the error status group, the off-line cause status byte is necessary because it contains the error status bit, and the error cause status byte is also required for getting information about what is a cause of the error condition and whether or not the error condition is recoverable.

Figure 7:
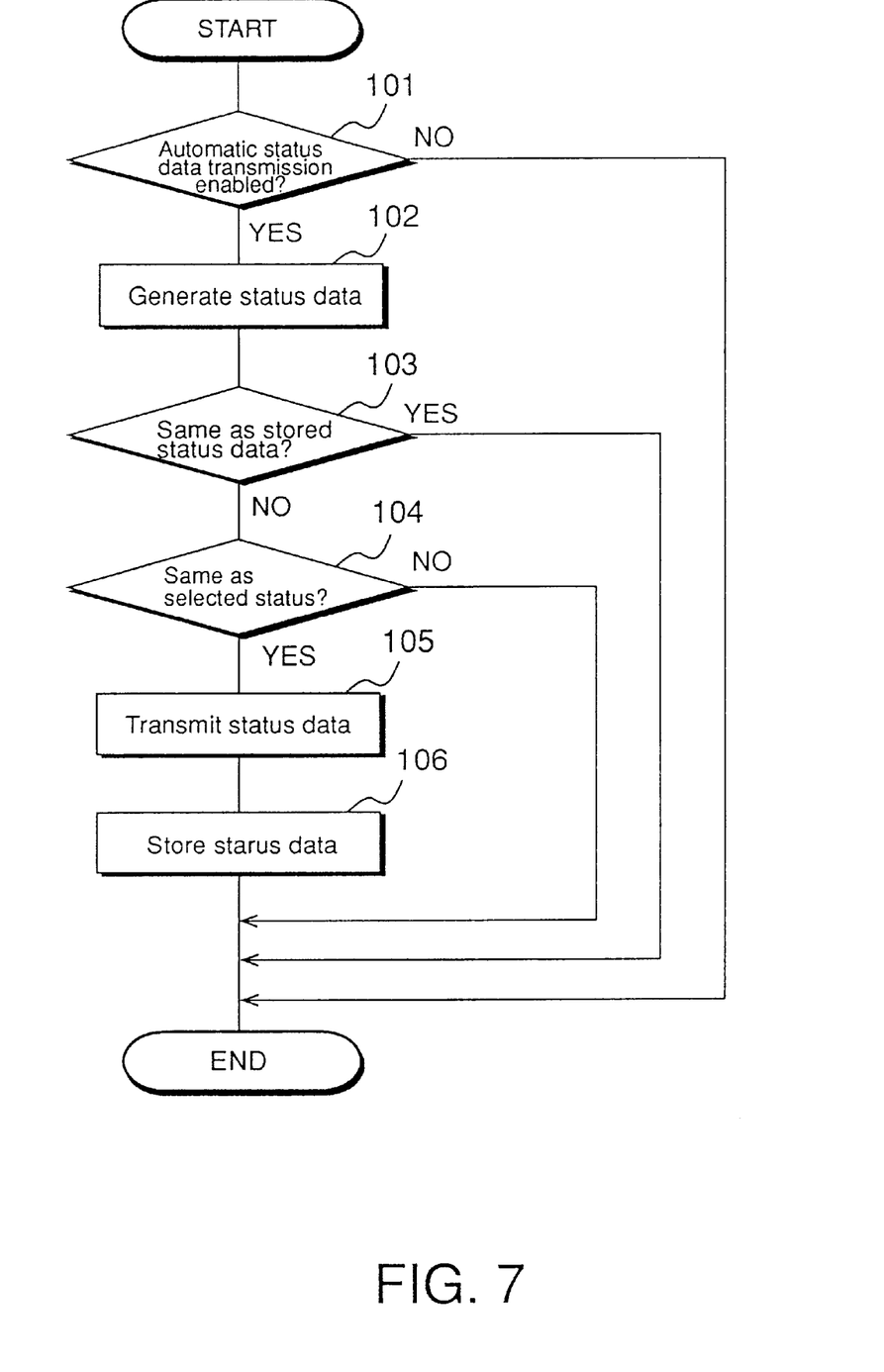
FIG. 7 is a flow chart of the overall process of a printing apparatus control method in accordance with preferred embodiment of the present invention.
Figure 8:
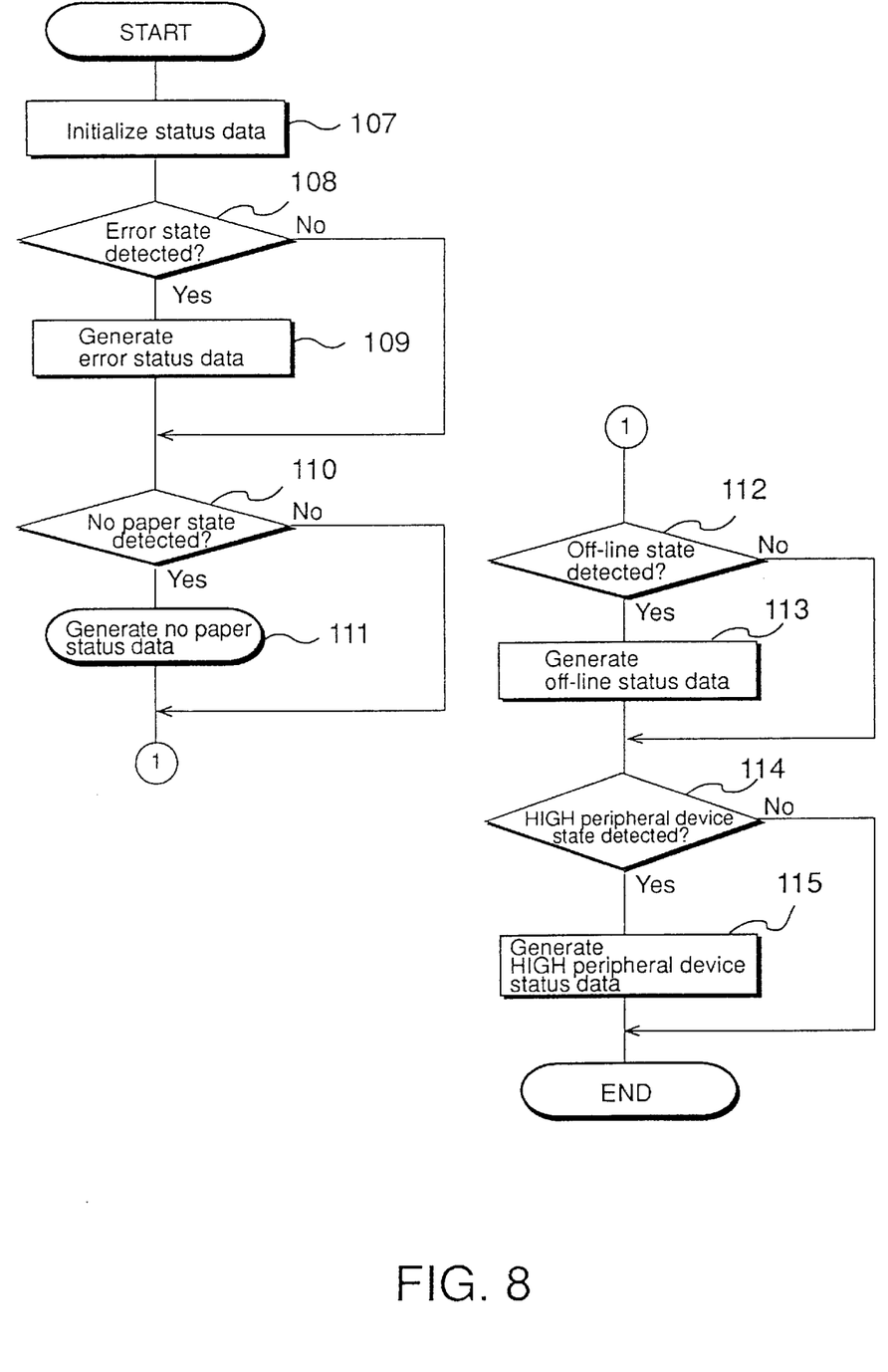
FIG. 8 is a flow chart of a subroutine of the processing in FIG. 7.
Figure 9:
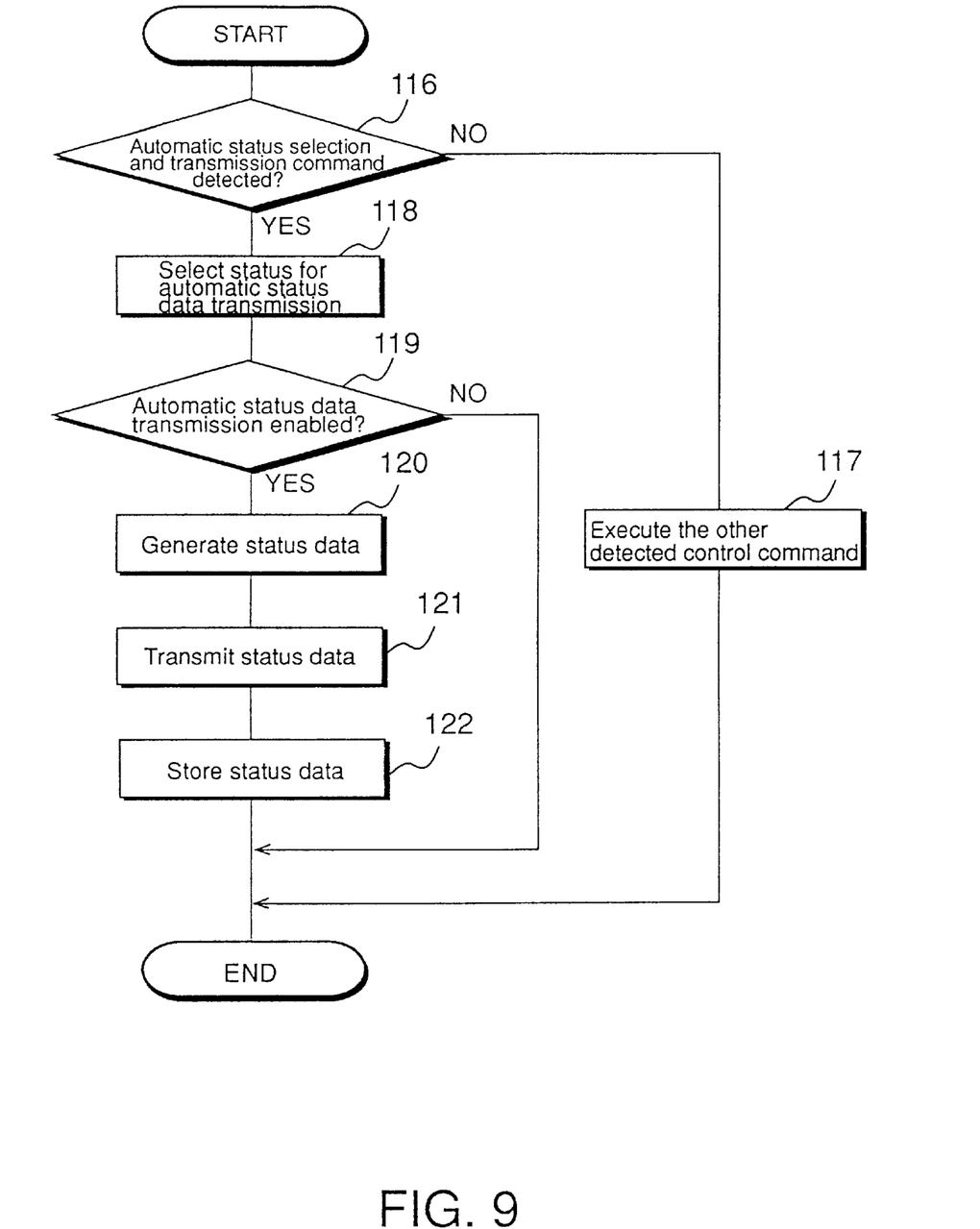
FIG. 9 is a flow chart of the automatic status selection routine.

FIGS. 7, 8, and 9 are flow charts showing the process of the control method of the printing apparatus of another embodiment of the present invention. FIG. 7 is the flow chart of the method of executing automatic status transmission by the printing apparatus of the invention.

Regular status data generating means 73 checks whether automatic status data transmission is enabled or disabled as controlled by automatic status selection and transmission means 75 (step 101), and generates the status data in the data format shown in Table 1 based on the detection result(s) returned by error detection means 68, paper detection means 70, peripheral device state detection means 71, and/or off-line detection means 72 at that time if automatic status data transmission is enabled (step 102). If automatic status data transmission is disabled, status data generation does not occur, and the process terminates.

In the present embodiment, the status data completed in step 102 are compared with he status data stored in status data storing means 76 by status data comparison means 74 in step 1-3. And then, if they are different form each other, namely at least one status bit in the status data completed in step 102 is different from corresponding status bit in the stored status data, the status bit or bits are then examined whether or not they are designated by automatic status transmission selection means 75 in step 104. FIG. 9 is an exemplary subroutine of the automatic status selection process and is described hereinbelow.

If the selected status has changed and is selected by the host processor by the automatic selection process, the newly generated status data is sent by data transmission means 77 to host computer 61 (step 105), is also stored to status data storing means 76 to update the stored status data (step 106). Otherwise, the automatic status data transmission process terminates.

FIG. 8 is a flow chart of the execution process of status data generation (step 102) shown in FIG. 7. The status data is initialized in the format shown in Tables 1 and 2 (step 107) with a value of 10H, specifically, no errors, paper loaded, on-line, peripheral device state HIGH, and the reserved bits set to the fixed values. If an error is then detected by error detection means 68 (step 108), bit 6 is set to '1' and the error status data is generated (step 109). If paper detection means 70 then detects that there is no paper (step 110), bit 5 is set to '1', and the 'no paper' status data is generated (step 111).

If off-line detection means 72 then detects an off-line state (step 112), bit 3 is set to '1' to generate the 'off-line' status data (step 113). Similarly, if peripheral device state detection means 71 detects a HIGH state (step 114), bit 2 is set to '1' to generate the HIGH peripheral device status data (step 115).

FIG. 9 is a flow chart of the automatic status selection and transmission command execution method in a printing apparatus according to the present invention. Data transmitted from host computer 61 and received by data receiving means 62 is stored to receive buffer 63. Command interpreting means 64 reads and interprets the data one at a time from receive buffer 63. If the interpreted command is not the automatic status selection and transmission command (step 116), it is executed according to the command instructions; if the interpreted data is printing data, the print pattern is stored to print buffer 65 (step 117).

If the interpreted data was the automatic status selection and transmission command (step 116), one data unit is read from receive buffer 63, and the status to be compared for automatic status data transmission is selected according to Table 2. If comparison data is selected, automatic status data transmission is enabled, but if no comparison data is selected, transmission is disabled (step 118). If automatic status data transmission is disabled (step 119), the process terminates. If automatic status data transmission is enabled, status data generation is enabled by regular status data generating means 73, and the status data sent first is generated according to the procedure shown in Table 8 (step 120).

The generated status data is then transmitted to host computer 61 by data transmission means 77 (step 121), and is stored to status data storing means 76 (step 122). At this time, the status data previously stored to status data storing means 76 is not compared with the transmitted status data by status data comparison means 74. As a result, host computer 61 can determine that automatic status data transmission was changed from a disabled to an enabled state.

As will be known from the above description of the invention, once the automatic status selection and transmission command is executed, the status data is transmitted only when the selected status changes, and the host computer can thus determine when the required status of the printing apparatus changes using the smallest possible amount of status data.

Because the frequency at which the status request command must be sent by the host computer is reduced, the command transmission overhead is reduced. Status data interpretation overhead is also reduced because the amount of status data received is reduced, and the efficiency of status data interpretation improves because only the minimum required status data is used. Furthermore, printing apparatus throughput improves because the status request command is not frequently executed.

As a result, a printing apparatus whereby a high reliability system can be built can be provided.

Figure 2:
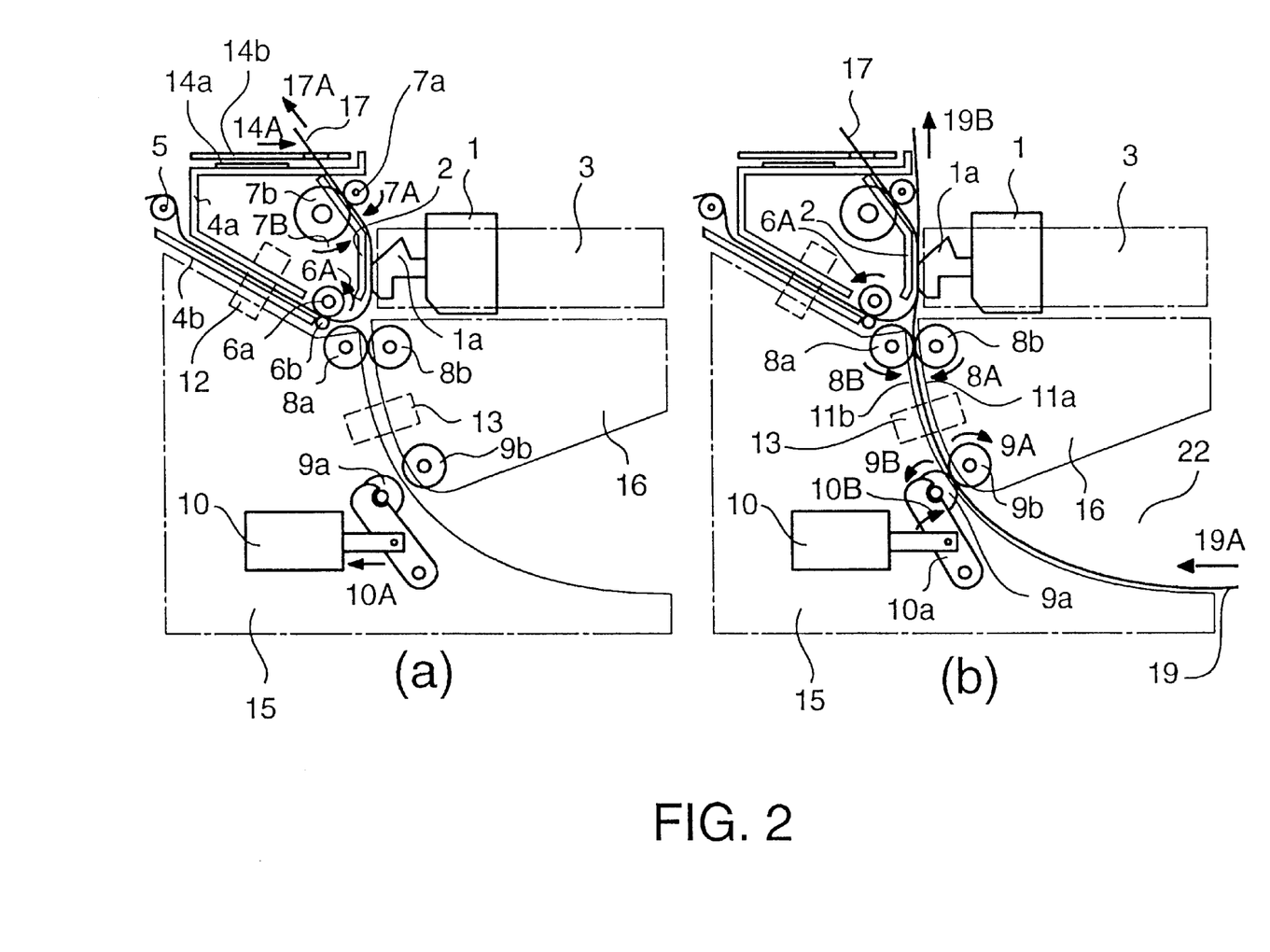
FIGS. 2A and 2B are cross-sectional views of a printing apparatus of FIG. 1.

While the invention has been described in conjunction with several specific embodiments, it is evident to those skilled in the art that many further alternatives, modifications and variations will be apparent in light of the foregoing description. In particular, the printer shown in FIGS. 1–3 is for illustrative purposes only. As will be appreciated by those of ordinary skill in the art other type of printers may incorporate the above-discussed inventive feature. Thus, the invention described herein is intended to embrace all such alternatives, modifications, applications and variations as may fall within the spirit and scope of the appended claims.

| Reference Numerals | |
|---|---|
| 61 | Host computer |
| 62 | Data receiving means |
| 63 | Receive buffer |
| 64 | Command interpreting means |
| 65 | Print buffer |
| 66 | Control means |
| 67 | Printer mechanism |
| 68 | Error detection means |
| 69 | Cover detection means |
| 70 | Paper detection means |
| 71 | Peripheral device state detection means |
| 72 | Off-line detection means |
| 73 | Regular status data generating means |
| 74 | Status data comparison means |
| 75 | Automatic status selection and transmission means |
| 76 | Status data storing means |
| 77 | Data transmission means |

FIG. 4

| | |
|---|---|
| 46 | Printer mechanism drive circuit |
| 47 | Printhead |
| 48 | Motor group |
| 49 | Plunger group |
| 52 | Carriage detector |
| 53 | Home position detector |
| 54 | Automatic cutter detector |
| 55 | Paper detectors |
| 56 | Cover detectors |

FIG. 5

HOST COMPUTER SIDE

| | |
|---|---|
| 61 | Host computer |

PRINTING APPARATUS SIDE

| | |
|---|---|
| 62 | Data receiving means |
| 63 | Receive buffer |
| 64 | Command interpreting means |
| 65 | Print buffer |
| 66 | Control means |
| 67 | Printer mechanism |
| 68 | Error detection means |
| 69 | Cover detection means |
| 70 | Paper detection means |
| 71 | Peripheral device state detection means |
| 72 | Off-line detection means |
| 73 | Regular status data generating means |
| 74 | Status data comparison means |
| 75 | Automatic status selection and transmission means |
| 76 | Status data storing means |
| 77 | Data transmission means |

What is claimed is:

1. A printing apparatus for printing on a recording medium in accordance with data received from a host device, comprising:

a data transmitter which sends to the host device status data of the printing apparatus in accordance with a change in the status data; and a controller which changes the state of said data transmitter to either an enabled state or a disabled state in accordance with a predetermined data received from the host device, wherein said data transmitter sends to the host device the status data in response to said controller changing said data transmitter to the enabled state.

2. A printing apparatus according to claim 1, wherein said data transmitter comprises:

a memory for storing the status data; and a comparator for comparing a present status data with the status data stored in said memory to determine the change in the status data.

3. A printing apparatus according to claim 1, wherein said controller comprises:

a command interpreter to interpret the data received from the host device to detect the predetermined data requiring the printing apparatus to one of (1) enable said data transmitter, and (2) disable said data transmitter.

4. A printing apparatus according to claim 1, wherein said status data includes at least one of:

a peripheral device state;

an interface state;

a cover state;

a form feeding state;

a printing state;

a mechanical error state;

a cutter error state;

a non-recoverable error state;

an automatically recoverable error state;

a roll paper near-end state;

a roll paper present state;

a slip paper selected state;

a slip paper waiting state;

a slip paper present state;

a validation paper selected state;

a validation paper waiting state; and a validation paper present state.

5. A printing apparatus for printing on recording media in accordance with data received from a host device, comprising:

an operating state selector to set each of a plurality of operating states of the printing apparatus to one of an enabled state and a disabled state in accordance with a predetermined data received from the host device; and a data transmitter which sends to the host device status data representing at least the plurality of operating states in accordance with a change in the operating state set to the enabled state by said operating state selector, wherein said data transmitter sends to the host device the status data in response to changing the operating state by said operating state selector to the enabled state.

6. A printing apparatus according to claim 5, wherein said data transmitter comprises:

a memory for storing at least the operating state set to enabled state; and a comparator for comparing at least the operating state set to the enabled state with the corresponding operating state stored in said memory to determine the change in the operating state set to the enabled state.

7. A printing apparatus according to claim 5, wherein said operating state selector comprises:

a command interpreter to interpret the data received from the host device to detect the predetermined data requiring the printing apparatus to set each of the operating states to one of the enabled and disabled state.

8. A printing apparatus according to claim 5, further comprising at least one of:

a peripheral state detector to detect a state of a peripheral device connected to the printing apparatus;

an interface state detector to detect a state of an interface of the printing apparatus;

a paper state detector to detect a paper detector state; and an error state detector to detect an error state of the printing apparatus.

9. A printing apparatus according to claim 5, wherein said status data includes at least one of:

a peripheral device state;

an interface state;

a cover state;

a form feeding state;

a printing state;

a mechanical error state;

a cutter error state;

a non-recoverable error state;

an automatically recoverable error state;

a roll paper near-end state;

a roll paper present state;

a slip paper selected state;

a slip paper waiting state;

a slip paper present state;

a validation paper selected state;

a validation paper waiting state; and a validation paper present state.

10. A control method for a printing apparatus for printing on a recording medium in accordance with data received from a host device, comprising the steps of:

(a) detecting a change in status data of the printing apparatus;

(b) sending to the host device the status data in accordance with the change in the status data detected in said detecting step (a);

(c) selectively enabling or disabling said sending step (b) in accordance with a predetermined data received from the host device, and (d) sending to the host device the status data in response to said sending step (b) being enabled in said step (c).

11. A control method according to claim 10, wherein said detecting step (a) comprises the steps of:

(a1) storing the status data in a memory; and (a2) comparing a present status data with the status data stored in the memory.

12. A control method according to claim 10, wherein said step (c) comprises the step of:

(c1) interpreting the data received from the host device to detect the predetermined data requiring the printing apparatus to one of (1) enable at least one of said detecting step (a) and said sending step (b), and (2) disable at least one of said detecting step (a) and said sending step (b).

13. A control method according to claim 10, wherein said detecting step (a) comprises at least one of the steps of:

(a3) detecting a peripheral device state;

(a4) detecting an interface state;

(a5) detecting a cover state;

(a6) detecting whether a form is being fed;

(a7) detecting whether printing is stopped;

(a8) detecting whether a mechanical error is detected;

(a9) detecting whether a cutter error is detected;

(a10) detecting whether a non-recoverable error is detected;

(a11) detecting whether an automatically recoverable error is detected;

(a12) detecting whether a roll paper near-end is detected;

(a13) detecting whether roll paper is present;

(a14) detecting whether slip paper is selected;

(a15) detecting whether the printing apparatus is waiting for slip paper to be inserted;

(a16) detecting whether slip paper is present;

(a17) detecting whether validation paper is selected;

(a18) detecting whether the printing apparatus is waiting for validation paper to be inserted; and (a19) detecting whether validation paper is present.

14. A control method for a printing apparatus for printing on a recording medium in accordance with data received from a host device, comprising the steps of:

(a) setting each of a plurality of operating states of the printing apparatus to one of an enabled and disabled state in accordance with a predetermined data received from the host device;

(b) sending to the host device status data representing at least the plurality of operating states in accordance with a change in the operating state set to the enabled state in said setting step (a), and (c) sending to the host device the status data in response to at least one of said operating states changing to the enabled state in said setting step (a).

15. A control method according to claim 14, wherein said sending step (b) comprises the steps of:

(b1) storing in a memory at least the operating state set to the enabled state; and (b2) comparing at least the operating state set to the enabled state with the corresponding operating state stored in the memory.

16. A control method according to claim 14, wherein said setting step (a) comprises the step of:

(a1) interpreting the data received from the host device to detect the predetermined data requiring the printing apparatus to set each of the operating states to one of the enabled and disabled states.

17. A control method according to claim 14, wherein said sending step (b) comprising at least one of the steps of:

(b1) detecting a state of a peripheral device connected to the printing apparatus;

(b2) detecting a state of an interface of the printing apparatus;

(b3) detecting a paper detector state; and (b4) detecting an error state of the printing apparatus.

18. A control method according to claim 14, wherein said sending step (b) comprising at least one of the steps of:

(b5) detecting a peripheral device state;

(b6) detecting an interface state;

(b7) detecting a cover state;

(b8) detecting whether a form is being fed;

(b9) detecting whether printing is stopped;

(b10) detecting whether a mechanical error is detected;

(b11) detecting whether a cutter error is detected;

(b12) detecting whether a non-recoverable error is detected;

(b13) detecting whether an automatically recoverable error is detected;

(b14) detecting whether a roll paper near-end is detected;

(b15) detecting whether roll paper is present;

(b16) detecting whether slip paper is selected;

(b17) detecting whether the printing apparatus is waiting for slip paper to be inserted;

(b18) detecting whether slip paper is present;

(b19) detecting whether validation paper is selected;

(b20) detecting whether the printing apparatus is waiting for validation paper to be inserted; and (b21) detecting whether validation paper is present.

19. A printing apparatus for printing on a recording medium in accordance with data received from a host device, comprising:

a data transmitter; and a controller which changes the state of said data transmitter to either an enabled state or a disabled state in accordance with a predetermined data received from the host device, and said data transmitter sending to the host device status data in response to one of:

a change in the status data, and said controller changing said data transmitter to the enabled state.

* * * * *